Patented Apr. 30, 1929.

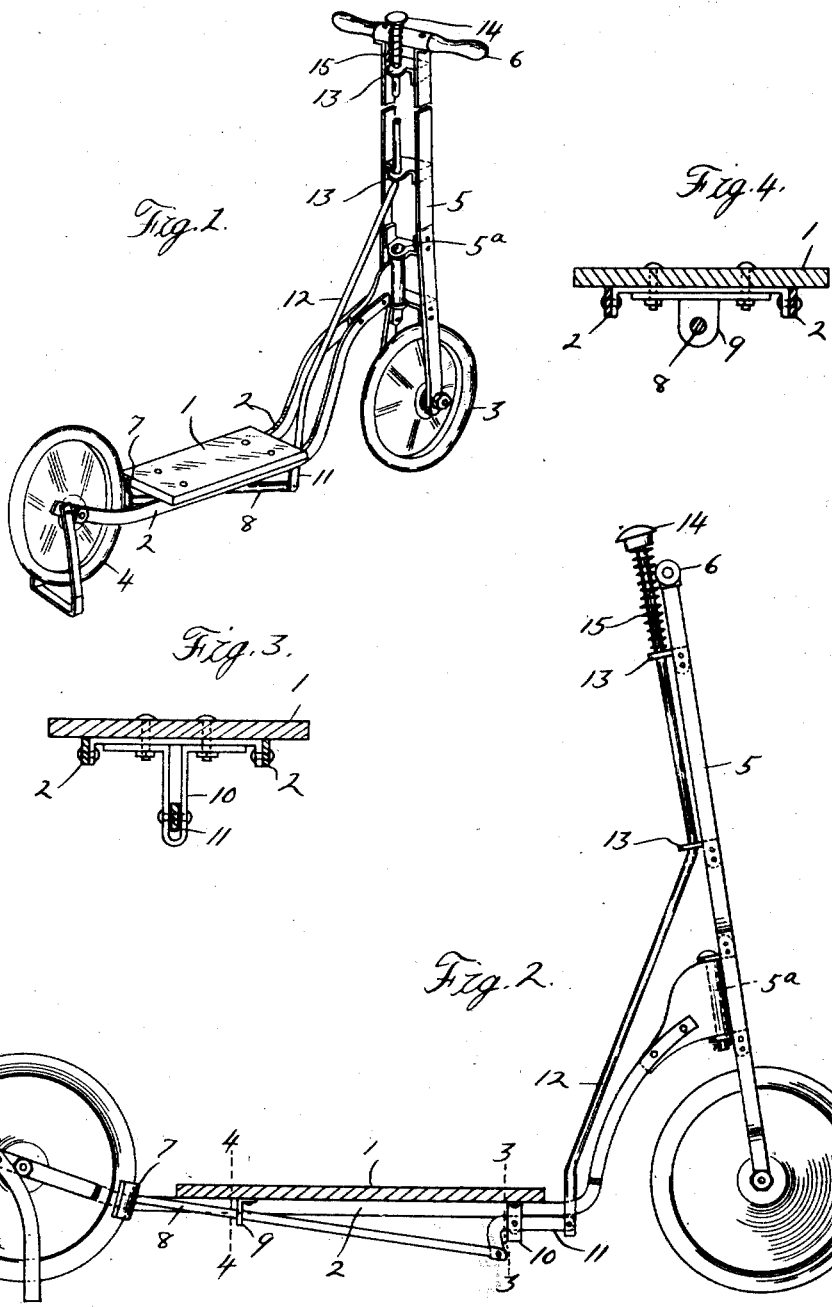

1,711,121

UNITED STATES PATENT OFFICE.

FRANK A. NAUTS, OF TOLEDO, OHIO, ASSIGNOR TO THE GENDRON WHEEL COMPANY, OF TOLEDO, OHIO, A CORPORATION OF OHIO.

SCOOTER.

Application filed September 15, 1924. Serial No. 737,810.

This invention relates to brakes and relates particularly to brakes for children's vehicles.

One object of the invention is to provide a brake for a child's vehicle having a steering post, control of said brake being exercised by an element mounted upon said steering post.

A further object is to arrange said controlling element in such a relation to the pivotal axis of the steering post as to permit the steering and braking operations to be accomplished without interference.

Still another object is to provide a brake shoe or the like engageable with a rear wheel of a child's vehicle, and more particularly a two-wheeled child's vehicle having its wheels arranged in tandem, and to provide for manual control of said shoe by an element mounted upon a steering post of the vehicle.

These and various other objects the invention attains by the construction hereinafter described and illustrated in the accompanying drawing, wherein:

Figure 1 is a perspective view of a child's vehicle equipped with the improved brake;

Figure 2 is a view of the same in side elevation;

Figure 3 is a cross-sectional view, taken upon line 3—3 of Figure 2;

Figure 4 is a similar view on line 4—4 of Figure 2.

In these views, the reference character 1 designates a platform surmounting a frame comprised by two substantially parallel spaced metal bars or straps 2, which frame is supported by front and rear wheels 3 and 4, between which said platform is disposed at an approximate level with the centers of said wheels.

The rear wheel is mounted between the rear ends of the straps 2, and the front wheel is mounted between the lower ends of a pair of rigidly connected, substantially upright bars 5, forming a steering post. Said post is pivoted by a pin $5^a$ above the wheel 3 to the forward end of the frame 2, the latter being upwardly inclined from the platform 1 to said end. A suitable steering handle 6 is transversely mounted upon the upper end of the post 5.

7 is a brake shoe peripherally engageable with the rear wheel and mounted fast upon the rear end of a rod 8, extending beneath the platform 1, longitudinally thereof. A bracket 9 secured to the rear portion of the platform, therebeneath, provides a guide for said rod, and a bracket 10, similarly secured beneath the forward portion of said platform, pivotally mounts a bell-crank 11, one arm of which has an actuating connection with the front end of said rod.

12 is a plunger connected at its lower end to the other arm of said bell-crank, and having its upper portion alined with the pin $5^a$ and slidable in vertically spaced brackets 13 carried by the post 5. The lower portion of said plunger is rearwardly inclined from said post to its point of connection with said bell-crank. Between the uppermost bracket 13 and a knob 14, surmounting said plunger, a spring 15 is coiled upon the latter, normally maintaining a raised position of said plunger whereby the brake shoe is held clear of the wheel 4.

In the use of the described vehicle, the rider stands with one foot upon the platform 1, pushing the vehicle forwardly with the other foot. To apply the brake, a hand is rested upon the knob 14 and the plunger 12 is depressed. The resultant rocking of the bell-crank 11 shifts the rod 8 rearwardly and engages the shoe 7 firmly with the wheel 4, retarding the vehicle in proportion to the pressure exerted downwardly upon the plunger.

It will be noted that the actuable end of the plunger 12 is close adjacent to the steering handle 6, so that only a slight movement of the hand is necessary in operating the brake.

What I claim is:

1. In a child's vehicle, the combination with the frame thereof, and front and rear wheels supporting said frame, of a steering post pivoted to said frame and mounting the front wheel, a brake shoe engageable with a rear one of said wheels, a plunger having an upper portion mounted for reciprocation upon said post in line with the connection thereof to said frame, and having its lower portion rearwardly inclined, and an actuating connection between the lower end of said plunger and said shoe.

2. In a child's vehicle, the combination with a platform and front and rear supporting wheels therefor, of a brake-shoe engageable with a rear one of said wheels, a rod mounted beneath the platform and reciprocatory longitudinally thereof, and carrying said brake-shoe upon its rear end, a bell-crank having actuating connection with said rod, and a vertically reciprocatory plunger mounted forwardly of said platform and having actuating engagement with said bell-crank.

3. In a child's vehicle, the combination with the frame thereof and front and rear supporting wheels for said frame, of a steering post pivoted to said frame and mounting the front wheel, a brake shoe engageable with a rear one of said wheels, a plunger exercising control of said brake shoe, reciprocatory upon said post in line with the axis of connection between said post and frame, and a spring acting upon said plunger normally maintaining the brake shoe in released position.

4. In a child's vehicle, the combination with a platform and a frame, supporting front and rear wheels therefor, a steering post, of a brake shoe engageable with a rear one of said wheels, and a plunger operatively connected to said brake shoe mounted for reciprocation upon said steering post in line with the connection of said post to said frame.

5. In a child's vehicle, the combination with a frame and a platform, front and rear supporting wheels therefor, a steering post, said platform being disposed between said front and rear wheels in a plane slightly below the center of said wheels, of a brake shoe engageable with a rear one of said wheels, a rod carrying said shoe and reciprocatory beneath said platform, a bell-crank having actuating connection with said rod, and a plunger mounted forwardly of said platform and having actuating engagement with said bell-crank.

6. In a child's vehicle, the combination with a frame thereof, front and rear wheels supporting said frame, of a steering post pivoted to said frame and mounting the front wheel, a brake shoe engageable with the rear wheel, a plunger having its upper portion in line with the axis of connection between said post and frame, and a spring acting upon said plunger normally maintaining the brake shoe in released position.

In testimony whereof I affix my signature.

FRANK A. NAUTS.